United States Patent [19]

Nagano

[11] Patent Number: 4,584,348

[45] Date of Patent: Apr. 22, 1986

[54] POLYMER COMPOSITION OF OLEFIN/CARBOXYLIC ACID COPOLYMER AND ELASTOMER

[75] Inventor: Riichiro Nagano, Hiroshima, Japan

[73] Assignee: Mitsui Petrochemical Industries, Inc., Tokyo, Japan

[21] Appl. No.: 651,893

[22] Filed: Sep. 19, 1984

[30] Foreign Application Priority Data

Sep. 19, 1983 [JP] Japan .................................. 58-171184

[51] Int. Cl.$^4$ ...................... C08L 23/20; C08L 23/22; C08L 23/08; C08L 23/16
[52] U.S. Cl. .................................... 525/207; 525/211; 525/221; 428/474.1; 428/500
[58] Field of Search ................................ 525/207, 221

[56] References Cited

U.S. PATENT DOCUMENTS

| | | | |
|---|---|---|---|
| 3,410,928 | 11/1968 | Baum | 525/221 |
| 3,868,433 | 2/1975 | Bartz et al. | 525/74 |
| 4,302,557 | 11/1981 | Yoshimura et al. | 525/221 |
| 4,307,204 | 12/1981 | Vidal | 525/221 |

Primary Examiner—Carman J. Seccuro
Attorney, Agent, or Firm—Sherman and Shalloway

[57] ABSTRACT

A polymer composition comprising
(A) 81 to 99 parts by weight of a copolymer containing olefin units and unsaturated carboxylic acid compound units and having an intrinsic viscosity [η] of 0.5 to 10 dl/g and a crystallinity of at least 20%, and
(B) 19 to 1 part by weight of a thermoplastic elastomer having an initial modulus of not more than 100 kg/cm$^2$, a glass transition temperature of not more than 0° C. and a weight average molecular weight ($\overline{M}w$) of at least 400,000.

The above composition is useful as an adhesive.

16 Claims, No Drawings

POLYMER COMPOSITION OF OLEFIN/CARBOXYLIC ACID COPOLYMER AND ELASTOMER

This invention relates to a polymer composition having improved adhesion. More specifically, it relates to an olefinic copolymer composition having improved adhesion, especially to polar materials.

Techniques of introducing functional groups into polyolefins by copolymerization have been widely used for the purpose of modification. For example, copolymers obtained by copolymerizing olefins with carboxylic acids, carboxylic acid anhydrides, etc. having unsaturated bonds have improved dyeability, printability, ease of plating, antistatic property, ease of washing, hygroscopicity and adhesion. In many cases, the introduction of these functional groups increases the inherently poor adhesion of polyolefins to polar materials such as metals, concrete, polar resins and wood. Hence, such modified polyolefins are used as laminates with these materials or as an adhesive interlayer of laminates of these materials with each other, or as a surface protective coating on these polar materials.

However, because the adhesion of these olefinic copolymers is not necessarily sufficient, it has been desired to increase their adhesion strength further while retaining other properties such as dyeability or printability improved by copolymerization. Specifically, these modified olefinic copolymers have the defect that depending upon the types of functional groups introduced into the polyolefins, the degree of their introduction and the types of polar materials to be bonded, their adhesion may be low, or under rigorous use conditions or under some bonding conditions, these olefinic copolymers will easily peel off.

U.S. Pat. No. 3,869,422 discloses a heat-sealable composition containing 40–80 weight percent crystalline copolymers of ethylene and acrylic acid or methacrylic acid wherein the acid is present in the copolymer in amounts of from 5–15 weight percent, said acid being free of neutralizing metal ions and 20–45 weight percent of an amorphous elastomeric copolymer of ethylene containing 20–60 weight percent propylene and, optionally, up to 10 weight percent of a nonconjugated diene. This composition is characterized by having excellent heat-sealing property, and the patent is silent on its adhesion to other materials. The heat-sealing property is the property of the same kind of polymers to melt-adhere each other (self-adhering property) under a small amount of heat, whereas the adhering property is the property of different kinds of materials to adhere to each other. There is an essential difference between the two.

The present inventor made investigations in order to eliminate the aforesaid defect of polyolefins having adhesion with functional groups introduced thereinto. These investigations have led to the discovery that a composition comprising a carboxyl group-containing olefinic copolymer having adhesion and an elastomer having specified properties finely dispersed in a specified proportion in the olefinic copolymer is free from the aforesaid defect.

Thus, according to this invention, there is provided a polymer composition comprising (A) 81 to 99 parts by weight of a copolymer containing olefin units and unsaturated carboxylic acid compound units and having an intrinsic viscosity $[\eta]$ of 0.5 to 10 dl/g and a degree of crystallization of at least 20%, and (B) 19 to 1 part by weight of a thermoplastic elastomer having an initial modulus of not more than 100 kg/cm$^2$, a glass transition temperature of not more than 0° C. and a weight average molecular weight ($\overline{M}w$) of at least 400,000.

The copolymer (A) forming a main component in the composition of this invention is an olefinic copolymer consisting basically of the olefin units and the unsaturated carboxylic acid compound units and denotes a polymer containing an olefin as a main component obtained by random, block or alternate copolymerization of the olefin, an unsaturated carboxylic acid compound and as required, another monomer, or a mixture of this polymer with a polyolefin.

The olefin constituting the copolymer (A) is an olefin which may have a branched chain, and its examples include such as ethylene, propylene, 1-butene, 1-pentene, 1-hexene, 4-methyl-1-pentene, 3-methyl-1-pentene, 1-octene, 1-decene, 1-dodecene, 1-hexadecene, 1-octadecene and 1-eicosene. These olefins may generally have 2 to 20, preferably 2 to 16, more preferably 2 to 10, carbon atoms. They may be used singly or in combination. Ethylene is especially preferred.

The unsaturated carboxylic acid compound to be copolymerized with the olefin includes compounds containing at least 1, preferably 1 to 2, radical-polymerizable ethylenically unsaturated bond and at least one, preferably 1 to 3, carboxyl groups (the carboxyl groups may form anhydrides). Those unsaturated acid compounds which generally have 3 to 20, preferably 3 to 16, more preferably 3 to 12, carbon atoms are suitable. Specific examples of the unsaturated acid compound include unsaturated monocarboxylic acids such as acrylic acid, methacrylic acid, vinylacetic acid, ethylacrylic acid, 3-pentenoic acid, allylacetic acid, 5-hexenoic acid, 6-heptenoic acid, 7-octenoic acid, 8-nonenoic acid, 10-undecylenic acid, 2,4-pentadienic acid and carboxystyrene; unsaturated dicarboxylic acids such as maleic acid, fumaric acid, itaconic acid, citraconic acid, allylsuccinic acid, mesaconic acid, gluconic acid, Nadic Acid, MethylNadic Acid, tetrahydrophthalic acid and methylhexahydrophthalic acid; unsaturated dicarboxylic acid anhydrides such as maleic anhydride, itaconic anhydride, citraconic anhydride, allylsuccinic anhydride, glutaconic anhydride, Nadic Anhydride, MethylNadic Anhydride, tetrahydrophthalic anhydride, 3,6-endomethylenephthalic anhydride,

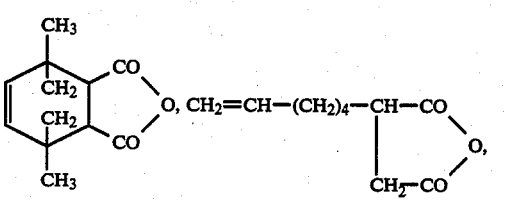

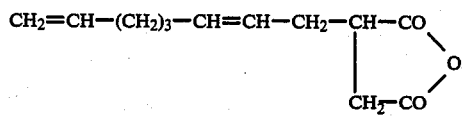

-continued

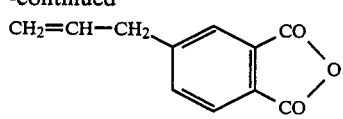

and unsaturated monobasic anhydrides such as $CH_2=CH-(CH_2)_8COOCOCH_3$ and $[CH_2=CH-(CH_2)_8-CO]_2O$.

These unsaturated carboxylic acid compounds may be used singly or in combination in their copolymerization with the olefins. Of these unsaturated carboxylic acid compounds, acrylic acid, methacrylic acid and maleic anhydride are especially preferred.

The olefinic copolymer used in this invention can consist essentially of the olefin units and the unsaturated carboxylic acid compound units. If required, it may further contain units of another monomer. Examples of the other monomer are alkyl esters of the aforesaid unsaturated carboxylic acids, such as methyl(meth)acrylate, ethyl(meth)acrylate, propyl(meth)acrylate, n-butyl(meth)acrylate, isobutyl(meth)acrylate, sec-butyl(meth)acrylate, 2-ethylhexyl(meth)acrylate, 2-hydroxyethyl(meth)acrylate and 2-hydroxypropyl(meth)acrylate, glycidyl(meth)acrylate, dimethylaminoethyl(meth)acrylate, diethyl aminoethyl(meth)acrylate, vinyl acetate, and carbon monoxide. When the other monomer is used, the proportion of units derived from the other monomer is conveniently up to 95 mole%, preferably not more than 90 mole%, more preferably not more than 80 mole%, based on the total amount of the units of the unsaturated carboxylic acid compound and its derivatives in the copolymer.

The proportion of the unsaturated carboxylic acid compound based on the olefin may vary widely depending upon the type of the unsaturated carboxylic acid compound, etc. Generally, it is desirable to copolymerize the unsaturated carboxylic acid compound in a proportion of $10^{-6}$ to $5\times10^{-3}$ gram-equivalent, preferably $5\times10^{-6}$ to $3\times10^{-3}$ gram-equivalent, more preferably $10^{-5}$ to $2\times10^{-3}$ gram-equivalent, per gram of the resulting copolymer.

The copolymer (A) used in this invention can be prepared by copolymerizing the olefin with the unsaturated carboxylic acid compound and, if required, another monomer by a copolymerization method known per se, for example by copolymerizing them using a Ziegler-Natta catalyst, or by subjecting them to radical polymerization under high pressures in the presence or absence of a radical initiator.

The copolymerization method using the Ziegler-Natta catalyst may be carried out by copolymerizing the olefin and the unsaturated carboxylic acid compound in the liquid phase in an inert hydrocarbon or chlorinated hydrocarbon solvent or in a liquefied olefin, or by copolymerizing them by contacting the monomeric mixture in the vapor phase with the catalyst. Copolymerization is carried out usually at a temperature of 0° to 130° C. and a pressure of 0 to 50 atmospheres. When the solvent is used, the concentration of the catalyst is usually 0.01 to 1000 millimoles/liter (for details of such a copolymerization method, see, for example, Japanese Patent Publications Nos. 9908/1969, 120275/1969 and 43191/1973).

The high-pressure radical polymerization method is described in the literature, and is well known. Briefly stated, it comprises introducing a mixture of the olefin and the unsaturated carboxylic acid compound into a polymerization atmosphere maintained at a high pressure of, for example, 50 to 300 atmospheres and a temperature of 150° to 300° C. together with a radical polymerization initiator, for example a peroxide, a hydroperoxide or an azo compound capable of forming a radical upon decomposition under the reaction conditions. If required, a solvent inert to the above system, for example water or benzene, may be used in this method. The polymerization may substantially be carried out in bulk.

Examples of the copolymer (A) produced as above include ethylene/(meth)acrylic acid type copolymers such as ethylene/acrylic acid copolymer, ethylene/methacrylic acid copolymer, ethylene/propylene/(meth)acrylic acid copolymer, ethylene/(meth)acrylic acid/vinyl acetate copolymer, ethylene/(meth)acrylic acid/methyl(meth)acrylate copolymer, ethylene/(meth)acrylic acid/n-butyl(meth)acrylate copolymer, ethylene/(meth)acrylic acid/isobutyl(meth)acrylate copolymer, ethylene/(meth)acrylic acid/hexyl(meth)acrylate copolymer, ethylene/methacrylic acid/2-hydroxyethyl(meth)acrylate copolymer, ethylene/(meth)acrylic acid/carbon monoxide copolymer and ethylene/propylene/10-undecyleneic acid copolymer; ethylene/maleic anhydride type copolymers such as ethylene/maleic anhydride copolymer, ethylene/maleic anhydride/methyl(meth)acrylate copolymer and ethylene/maleic anhydride/ethyl(meth)acrylate copolymer; propylene/acrylic acid copolymer; propylene/10-undecylenic acid copolymer; 1-butene/10-undecylenic acid copolymer; 4-methyl-1-pentene/10-undecylenic acid copolymer; and 3-methyl-1-pentene/10-undecylenic acid copolymer.

When the resulting copolymer contains a group convertible to a carboxyl group, such as a carboxylate ester group, a carboxylic acid amide group, a carboxylic acid imide group, a metal salt of a carboxylic acid or a carboxylic acid anhydride group, such a group may be partly or wholly converted to a carboxyl group. Or conversely, the carboxyl groups in the copolymer may be partly converted to such carboxylic acid derivative groups. Examples of monomers which can be converted to carboxylic acids as above include esters, acid amides, and imides of the aforesaid unsaturated carboxylic acids, and their metal salts a part or the whole of which are neutralized with metallic ions having a valence of 1, 2 or 4.

It has been found that in order to provide a polymer composition having improved adhesion as intended by this invention, the copolymer (A) should have an intrinsic viscosity [η] of 0.5 to 10 dl/g, preferably 0.7 to 7 dl/g, more preferably 0.8 to 5 dl/g.

In the present specification and the appended claims, the "intrinsic viscosity [η]" is measured in decalin at 135° C.

For a similar reason, it is important that the copolymer (A) should have a crystallinity of at least 20%. In the present specification and the appended claims, the "crystallinity" is measured by an X-ray diffraction method using a sample prepared by the method described in ASTM D-618. The copolymer (A) may have a crystallinity of preferably at least 25%, more preferably at least 35%.

The molecular weight distribution of the copolymer (A) used in accordance with this invention, which is expressed by the ratio of its weight average molecular weight ($\overline{M}w$) to its number average molecular weight ($\overline{mn}$), i.e. $\overline{Mw}/\overline{Mn}$, is desirably relatively small. Generally, it is advantageous that the ratio $\overline{Mw}/\overline{Mn}$ is from 1 to 40, preferably from 1 to 30, more preferably from 1 to 20.

The weight average molecular weight $\overline{Mw}$ and the number average molecular weight $\overline{Mn}$ of the polymer are measured by the following procedure using gel permeation chromatography (GPC). 150 mg of the polymer, 100 ml of o-dichlorobenzene as a solvent and 0.04 g of 2,6-di-tertbutyl-p-cresol as a stabilizer are mixed. The mixture is heated to 140° C. to dissolve the polymer. The solution is passed through a 0.2-micron filter to remove insoluble materials such as dirt and dust at 140° C. Then, the measurement is carried out by using a GPC measuring device (Model LC-GPC 150C of Waters Associates Inc.) and a column (Type TSKGMH6 of Toyo Soda Manufacturing Co., Ltd.) at a temperature of 135° C. and a flow rate of 1.0 ml/min. The numerical value is converted to a value based on polystyrene.

According to this invention, the copolymer (A) is blended with the thermoplastic elastomer (B) having an initial modulus of not more than 100 kg/cm$^2$, a glass transition temperature (Tg) of not more than 0° C. and a weight average molecular weight ($\overline{Mw}$) of at least 400,000.

The "initial modulus" in the present specification and the appended claims is a modulus at 100% stretch measured in accordance with the method described in JIS K6301. It is important that the elastomer (B) used in this invention should have an initial modulus of not more than 100 kg/cm$^2$. Preferably, it may have an initial modulus of not more than 80 kg/cm$^2$, especially not more than 60 kg/cm$^2$.

It is important that the elastomer (B) should have a glass transition temperature (Tg) of not more than 0° C. Advantageously, it has a glass transition temperature of preferably −150° to 0° C., more preferably −130° to −20° C. In the present specification and the appended claims, the "glass transition temperature (Tg)" is measured by the method described in J. Applied Polymer Science, 1, 121 (1959).

It is important that the elastomer (B) should be a polymer having a weight average molecular weight ($\overline{Mw}$) measured by the method described above of at least 400,000, preferably at least 500,000. If the elastomer (B) has a weight average molecular weight of less than 400,000, its addition to the copolymer (A) does not produce an effect of improving the adhesion strength to such a high level as is observed in the present invention.

Examples of the thermoplastic elastomer used in this invention include polyisobutylene, polyhexene-1, polyoctene-1, ethylene/propylene copolymer rubber, ethylene/propylene/diene terpolymers, ethylene/1-butene copolymer rubber, 1-butene/ethylene copolymer rubber, polydecene-1, polydodecene-1, polyisoprene, butyl rubber and silicone rubber. These elastomers may be used singly or in combination.

Desirably, these elastomers have a crystallinity of generally not more than 30%, preferably not more than 25%, and more preferably not more than 20%. Conveniently, they have a molecular weight distribution ($\overline{Mw}/\overline{Mn}$) of from 1 to 30, preferably from 1 to 20, more preferably from 1 to 15.

Examples of the thermoplastic elastomer (B) which can be used advantageously in this invention are polyisobutylene, polyisoprene, butyl rubber, polyhexene-1, polyoctene-1, polydecene-1, ethylene/propylene copolymer rubber and ethylene/propylene/diene terpolymers. Ethylene/propylene rubber and ethylene/propylene/diene terpolymers desirably have an ethylene content of generally 50 to 90 mole%, preferably 55 to 85 mole% and a propylene content of generally 10 to 50 mole%, preferably 15 to 45 45 mole%.

The elastomer (B) may be present as a dispersed phase in a matrix of the copolymer (A) in the composition of this invention. When two or more kinds of the elastomer (B) are used, the dispersed phase may be composed of a mixture of the two or more elastomers, or each dispersed phase may be composed of a single elastomer. In the former case, the two or more elastomers (B) are mixed in advance and blended with the copolymer (A) by methods to be described below.

The composition of this invention can be prepared by blending and dispersing the thermoplastic elastomer (B) with and in the olefinic copolymer (A). The blending proportions of the copolymer (A) and the elastomer (B) may be within the following ranges provided that the total amount of (A) and (B) is 100 parts by weight.

| | Blending proportions (parts by weight) | | |
|---|---|---|---|
| | Broadest possible range | Preferred range | Most preferred range |
| Copolymer (A) | 81–99 | 85–97 | 88–95 |
| Elastomer (B) | 19–1 | 15–3 | 12–5 |

The elastomer (B) may generally form a dispersed phase of fine particles in the matrix of the olefinic copolymer (A). Desirably, the particle diameter of the dispersed phase of the elastomer (B), as its average circle equivalent diameter (d), is generally in the range of 0.1 to 5 microns, preferably 0.3 to 4 microns, more preferably 0.5 to 3 microns. The "average circle equivalent diameter (d)" is an index introduced because the particles in the dispersed phase are not always completely spherical. It is determined in accordance with the equation.

$$d = \frac{1}{n} \Sigma \sqrt{\frac{fi}{\pi}}$$

wherein n is the number of particles of the polymer (B) observed microscopically on the cross-section of the composition of this invention, and fi is the projected area of each of the particles.

The effect of improving the adhesion strength of this invention tends to be reduced when the dispersed particles of the polymer (B) has a d smaller than 0.1 micron or larger than 5 microns.

In order to achieve the effect of this invention, the dispersed particles of the elastomer (B) preferably should not be secondarily coagulated. For the elastomer (B) to form dispersed particles in the matrix of the olefinic copolymer (A), the compatibility between the elastomer (B) and the olefinic copolymer (A) is especially important. If the compatibility is too good, the aforesaid dispersed state does not result. Such an elastomer (B) in combination with the olefinic copolymer (A) cannot form a good composition intended by the present invention. In selecting the elastomer (B), therefore, its compatibility with the olefinic copolymer (A) should be considered.

Blending of the olefinic copolymer (A) and the elastomer (B) can be carried out by using polymer blending techniques known per se. Advantageously, the blending is carried out until the elastomer (B) forms the aforesaid dispersed phase of particles in the copolymer (A). For example, the copolymer (A) and the elastomer (B) are kneaded at a temperature above the higher melting point of the two but below 300° C. by means of an extruder, a kneader, a two-roll mill, a Banbury mixer, etc.

The composition of this invention can consist essentially of the olefinic copolymer (A) and the elastomer (B). If desired, it may further contain antioxidants, ultraviolet absorbers, antistatic agents, pigments, dyes, nucleating agents, fillers, slip agents, fire retardants, plasticizers, etc. which are used in ordinary polymeric substances in amounts which do not adversely affect the advantages of this invention. It may also contain polymeric substances other than the olefinic copolymer (A) and the elastomer (B).

The composition of this invention has especially good adhesion to polar materials as well as polyolefins, and can be advantageously used for producing laminates between the polar material and a polyolefin, or as an adhesive for bonding a plurality of polar substances. Examples of the polar substances include metals such as iron, copper, lead, nickel, zinc, and alloys of these metal elements such as stainless steel; concrete, wood, cellulose, natural fibers, and polar resins such as nylon, ethylene/vinyl alcohol copolymers, polyesters, polystyrene, polycarbonate, polyphenylene oxide, polyvinyl chloride, polyvinylidene chloride, polyacrylonitrile and ethylene/tetrafluoroethylene copolymer.

The composition of this invention may be bonded to a polar material by heating both of them to render at least the composition of the invention molten and then bonding them to each other. When the polar material is not thermoplastic, the composition of this invention in the molten state may be laminated to the polar material, or the two may be superimposed in advance and then bonded under heat melting. Alternatively, the composition of this invention may be adhered electrostatically to the polar material and then melt-laminated. There can also be used a method in which the polar material is heated to a temperature above the melting point of the composition of this invention, and the composition is adhered to it and simultaneously melted. When the polar material is thermoplastic, bonding can be effected by a method comprising melting both of the composition of this invention and the polar material and laminating them, or a method which comprises laminating the molten composition of the invention to the polar material. In bonding the composition of this invention and the polar material, it is not necessary to subject one or both surfaces of the polar material to such treatments as flaming treatment, corona discharge treatment or coating of a primer. If desired, such a pre-treatment may be performed.

Since the composition of this invention usually has good adhesion to polyolefins, it can be advantageously used as an interlayer in producing a laminate of a polar material and a polyolefin.

The composition of this invention can be used in many applications, for example laminated films, laminated sheets, laminated bottles, rust-proof coatings of metal plates or pipes, hot-melt adhesives, and paint film-forming elements.

The composition of this invention has improved adhesion to polar materials while retaining the other excellent properties of the polyolefin improved by copolymerization of the olefin with the unsaturated carboxylic acid compound.

The following examples illustrate the present invention in greater detail. It should be understood that the present invention should not be limited to these examples unless it departs from its scope.

EXAMPLE 1

Ninety parts by weight of ethylene/acrylic acid copolymer A-1 obtained by high-pressure radical copolymerization (acrylic acid unit content 8% by weight and $1.1 \times 10^{-3}$ gram-equivalent/g; $[\eta]$ 1.38 dl/g; crystallinity 40%) was mixed with 10 parts by weight of polyhexene-1 having a weight average molecular weight of 650,000, a glass transition temperature of $-52°$ C. and an initial modulus of 5 kg/cm$^2$ and kneaded by a single screw extruder set at a temperature of 230° C. to prepare a composition C-1.

Nylon-6 (CM-1020XF, a product of Toray Inc.), the composition C-1 and low-density polyethylene (Mirason M50, a product of Mitsui Dupont Polychemical Co., Ltd.) were fed into a three-layer manifold die set at a temperature of 260° C. from three separate extruders to form a three-layer sheet composed of nylon 6 as an outside layer I, the composition C-1 as an interlayer and the low-density polyethylene as an outside layer II having as thickness of 100 microns, 50 microns and 100 microns respectively. A test sample, 1 cm wide, was cut off from the three-layer sheet, and the peel strengths between the layers were measured by a 180° peel testing method. The results are summarized in Table 1.

EXAMPLES 2 TO 7 AND COMPARATIVE EXAMPLES 1 TO 7

In each run, a three-layer sheet was prepared by the same method as described in Example 1 except that the composition composed of a high-pressure-method ethylenic copolymer and an elastomer as shown in Table 1 was used as the interlayer and the polymer shown in Table 1 were used as the outside layers I and II. The peel strengths of the sheet were measured, and the results are shown in Table 1.

The three-layer manifold die was set at a temperature of 280° C. in Example 3 and Comparative Example 3, and at 210° C. in Examples 4 and 6 and Comparative Example 4.

TABLE 1

| | | Example 1 | Comparative Example 1 | Example 2 | Comparative Example 2 | Example 3 | Comparative Example 3 | Example 4 |
|---|---|---|---|---|---|---|---|---|
| Composition used as the interlayer | Olefinic copolymer (A) No. | A-1 | A-1 | A-1 | A-1 | A-2 | A-2 | A-3 |
| | Polar monomer 1 | Acrylic acid | Acrylic acid | Acrylic acid | Acrylic acid | Methacrylic acid | Methacrylic acid | Acrylic acid |
| | Content of the polar monomer 1 Weight % | 8 | 8 | 8 | 8 | 6 | 6 | 12 |
| | Gram-equivalent/g | $1.1 \times 10^{-3}$ | $1.1 \times 10^{-3}$ | $1.1 \times 10^{-3}$ | $1.1 \times 10^{-3}$ | $7.0 \times 10^{-4}$ | $7.0 \times 10^{-4}$ | $1.7 \times 10^{-3}$ |
| | Polar monomer 2 | None | None | None | None | Vinyl acetate | Vinyl acetate | Butyl acrylate |
| | Content of the polar monomer 2 (% by weight) | — | — | — | — | 15 | 15 | 13 |
| | [η] (dl/g) | 1.38 | 1.38 | 1.38 | 1.38 | 1.13 | 1.13 | 1.09 |
| | Crystallinity (%) | 40 | 40 | 40 | 40 | 22 | 22 | 31 |
| Elastomer (B) | Name | Polyhexene-1 | Not used | Polyhexene-1 | Polyhexene-1 | Polyhexene-1 | Not used | Polyisobutylene |
| | $\overline{M}w$ | 650,000 | — | 650,000 | 50,000 | 650,000 | — | 800,000 |
| | Tg (°C) | −52 | — | −52 | −50 | −52 | — | −65 |
| | Initial modulus (kg/cm²) | 5 | — | 5 | 5 | 5 | — | 5 |
| | Amount added (% by weight) | 10 | — | 5 | 10 | 5 | — | 10 |
| Composition | No. | C-1 | C-2 | C-4 | C-3 | C-5 | C-6 | C-7 |
| | Average particle diameter of the dispersed particles (microns) | 0.5–2 | — | 0.5–2 | 0.2–1 | 0.5–2 | — | 0.5–3 |
| Three-layer sheet | Polymer of the outside layer I | Nylon-6 | Nylon-6 | Nylon-6 | Nylon-6 | Polycarbonate | Polycarbonate | Eval (*1) |
| | Polymer of the outside layer II | Low-density polyethylene | Low-density polyethylene | Low-density polyethylene | Low-density polyethylene | Polyethylene terephthalate | Polyethylene terephthalate | High-impact polystyrene |
| | Peel strength to the outside layer I (g/cm) | 600 | 250 | 510 | 150 | 800 | 310 | 600 |
| | Peel strength to the outside layer II (g/cm) | Peeling impossible | Peeling impossible | Peeling impossible | Peeling impossible | 760 | 210 | 700 |

| | | Comparative Example 4 | Example 5 | Comparative Example 5 | Example 6 | Comparative Example 6 | Example 7 | Comparative Example 7 |
|---|---|---|---|---|---|---|---|---|
| Composition used as the interlayer | Olefinic copolymer (A) No. | A-3 | A-4 | A-4 | A-3 | A-3 | A-3 | A-3 |
| | Polar monomer 1 | Acrylic acid | Maleic anhydride | Maleic anhydride | Acrylic acid | Acrylic acid | Acrylic acid | Acrylic acid |
| | Content of the polar monomer 1 Weight % | 12 | 3 | 3 | 15 | 15 | 15 | 15 |
| | Gram-equivalent/g | $1.7 \times 10^{-3}$ | $3.1 \times 10^{-4}$ | $3.1 \times 10^{-4}$ | $2.1 \times 10^{-3}$ | $2.1 \times 10^{-3}$ | $2.1 \times 10^{-3}$ | $2.1 \times 10^{-3}$ |
| | Polar monomer 2 | Butyl acrylate | Ethyl acrylate | Ethyl acrylate | Butyl acrylate | Butyl acrylate | Butyl acrylate | Butyl acrylate |
| | Content of the polar monomer 2 (% by weight) | 13 | 9 | 9 | 8 | 8 | 8 | 8 |
| | [η] (dl/g) | 1.09 | 1.30 | 1.30 | 1.09 | 1.09 | 1.09 | 1.09 |
| | Crystallinity (%) | 31 | 35 | 35 | 31 | 31 | 31 | 31 |
| Elastomer (B) | Name | Not used | Polyisobutylene | Not used | Propylene-ethylene rubber (*2) | High-density polyethylene | Ethylene-propylene rubber (3*) | Ethylene-propylene rubber (*4) |
| | $\overline{M}w$ | — | 800,000 | — | 600,000 | 450,000 | 600,000 | 220,000 |
| | Tg (°C) | — | −65 | — | −26 | −45 | −46 | −48 |
| | Initial modulus (kg/cm²) | — | 5 | — | 60 | 120 | 20 | 15 |
| | Amount added (% by weight) | — | 10 | — | 10 | 10 | 10 | 10 |
| Composition | No. | C-8 | C-9 | C-10 | C-11 | C-12 | C-13 | C-14 |
| | Average particle diameter of the dispersed particles | — | 0.5–3 | — | 1–3 | 1–4 | 1–3 | 1–2 |

TABLE 1-continued

| Three-layer sheet | | Eval (*1) High-impact polystyrene | Nylon-6 Low-density polyethylene | Nylon-6 Low-density polyethylene | Eval (1*) Low-density polyethylene | Eval (1*) Low-density polyethylene | Eval (*1) Low-density polyethylene | Eval (*1) Low-density polyethylene |
|---|---|---|---|---|---|---|---|---|
| | Polymer of the outside layer I | | | | | | | |
| | Polymer of the outside layer II (microns) | 190 | 710 | 230 | 580 | 170 | 600 | 280 |
| | Peel strength to the outside layer I (g/cm) | 230 | Peeling impossible | Peeling impossible | 750 | 650 | 750 | 770 |
| | Peel strength to the outside layer II (g/cm) | | | | | | | |

(*1) Eval is a trade name for an ethylene/vinyl alcohol copolymer produced by Kuraray Co., Ltd.
(*2) Propylene content 60 mole %
(*3) Ethylene content 78 mole %
(*4) Ethylene content 77 mole %

EXAMPLE 8

Ninety parts by weight of a propylene/undecylenic acid copolymer prepared by polymerization under low pressures with a Ziegler catalyst (undecylenic acid unit content 3% by weight and $1.6 \times 10^{-4}$ gram-equivalent/g; $[\eta]$ 2.1 dl/g; crystallinity 51%) was mixed with 10 parts by weight of an ethylene/propylene copolymer elastomer having an ethylene content of 70 mole%, a weight average molecular weight of 480,000, a glass transition temperature of $-55°$ C. and an initial modulus of 10 kg/cm$^2$, and kneaded at 230° C. to prepare a composition C-15.

A three-layer sheet was prepared by the same method as described in Example 1 except that the composition C-15 was used as the interlayer and polypropylene (B230, a product of Mitsui Petrochemical Industries, Ltd.) was used as the outside layer II. The peel strength between the composition C-15 and nylon 6 was 660 g/cm, and the composition C-15 and polypropylene could not be peeled apart.

COMPARATIVE EXAMPLE 8

The procedure of Example 8 was repeated except that the ethylene/propylene copolymer elastomer was not used.

The peel strength between the interlayer and the nylon 6 layer was 230 g/cm, and the interlayer and the polypropylene layer could not be peeled apart.

EXAMPLE 9 AND COMPARATIVE EXAMPLE 9

By using the compositions C-1 and C-2 used in Example 1 and Comparative Example 1 as an adhesive layer, two-layer co-extrusion coating was carried out on a 1-inch steel pipe (JIS No. SPG, degreased and pickled) heated at 200° C. Low-density polyethylene (Mirason M50, a product of Mitsui Dupont Polychemical Co., Ltd.) was used as a top coat layer.

The thickness of the adhesive layer (the composition C-1 or C-2) was 100 microns and the thickness of the top coat low-density polyethylene layer was 2 mm.

The coated pipe was cooled with water, and a test sample having a width of 10 mm was cut off from it. The peel strength between the steel and the composition layer was 7 kg/cm (Example 9) and 2 kg/cm (Comparative Example 9).

What is claimed is:

1. A polymer composition comprising
   (A) 88 to 95 parts by weight of a copolymer containing olefin units and unsaturated carboxylic acid compound units and having an intrinsic viscosity $[\eta]$ of 0.5 to 10 dl/g and a crystallinity of at least 20%, and
   (B) 12 to 5 parts by weight of a thermoplastic elastomer selected from the group consisting of polyisobutylene and polyhexene-1 having an initial modulus of not more than 100 kg/cm$^2$, a glass transition temperature of not more than 0° C. and a weight average molecular weight ($\overline{Mw}$) of at least 400,000, said elastomer being dispersed in the form of particles having an average circle equivalent diameter of 0.1 to 5 microns in a matrix of the copolymer (A).

2. The composition of claim 1 wherein the elastomer is dispersed in the form of particles having an average circle equivalent diameter of 0.3 to 4 microns.

3. The composition of claim 1 wherein the copolymer (A) has an intrinsic viscosity $[\eta]$ of 0.7 to 7 dl/g and a crystallinity of at least 25%.

4. The composition of claim 1 wherein the ratio of the weight average molecular weight ($\overline{Mw}$) of the copolymer (A) to its number average molecular weight ($\overline{Mn}$), $\overline{Mw}/\overline{Mn}$, is from 1 to 40.

5. The composition of claim 1 wherein the copolymer (A) contains the unsaturated carboxylic acid compound units in an amount of $10^{-6}$ to $5 \times 10^{-3}$ gram-equivalent, per gram of the copolymer (A).

6. The composition of claim 1 wherein the olefin units are ethylene units.

7. The composition of claim 1 wherein the unsaturated carboxylic acid compound units are units derived from acrylic acid, methacrylic acid or maleic anhydride.

8. The composition of claim 1 wherein the elastomer (B) has a glass transition temperature (Tg) of $-130°$ to $-20°$ C.

9. An adhesive composed of the composition of claim 1.

10. The composition of claim 1 wherein the copolymer (A) is selected from the group consisting of ethylene/acrylic acid copolymer, ethylene/methacrylic acid copolymer, ethylene/propylene/(meth)acrylic acid copolymer, ethylene/(meth)acrylic acid/vinyl acetate copolymer, ethylene/(meth)acrylic acid/(meth)acrylate copolymer, ethylene/(meth)acrylic acid/ethyl(meth)acrylate copolymer, ethylene/(meth)acrylic acid/n-butyl(meth)acrylate copolymer, ethylene/(meth)acrylate acid/isobutyl(meth)acrylate copolymer, ethylene/(meth)acrylic acid/hexyl(meth)acrylate copolymer, ethylene/methacrylic acid/2-hydroxyethyl(meth)acrylate copolymer, ethylene/(meth)-acrylic acid/carbon monoxide copolymer, ethylene/propylene/10-undecylenic acid copolymer, ethylene/maleic anhydride/methyl(meth)acrylate, ethylene/maleic anhydride/ethyl(meth)acrylate copolymer, propylene/acrylic acid copolymer, propylene/10-undecylenic acid copolymer, 1-butene/10-undecylenic acid copolymer, 4-methyl-1-pentene/10-undecylenic acid copolymer, and 3-methyl-1-pentene/10-undecylenic acid copolymer.

11. The composition of claim 4 wherein the ratio $\overline{Mw}/\overline{Mn}$ is from 1 to 30.

12. The composition of claim 5 wherein the copolymer (A) contains the unsaturated carboxylic acid compound units in an amount of $5 \times 10^{-6}$ to $3 \times 10^{-3}$ gram-equivalent, per gram of the copolymer (A).

13. The composition of claim 8 wherein the elastomer (B) has an initial modulus of not more than 80 kg/cm$^2$ and a weight average molecular weight ($\overline{Mw}$) of at least 500,000.

14. The composition of claim 13 wherein the elastomer (B) has a crystallinity of not more than 25%.

15. A polymer composition having adhesion to polar materials comprising
   (A) 88 to 95 parts by weight of a copolymer of ethylene with from $10^{-6}$ to $5 \times 10^{-3}$ gram-equivalent, per gram of the copolymer (A) of an unsaturated carboxylic acid compound selected from the group consisting of acrylic acid, methacrylic acid, and maleic anhydride, said copolymer having an intrinsic viscosity $[\eta]$ of 0.7 to 7 dl/g and a crystallinity of at least 25%, and
   (B) 12 to 5 parts by weight of a thermoplastic elastomer having an initial modulus of not more than 80 kg/cm$^2$, a glass transition temperature of from $-130°$ to $-20°$ C. and a weight average molecular weight ($\overline{Mw}$) of at least 500,000, said elastomer (B) being dispersed in the form of particles having an average circle equivalent diameter of 0.1 to 5 microns in a matrix of the copolymer (A).

16. The composition of claim 15 wherein the thermoplastic elastomer is polyisobutylene or polyhexene-1.

UNITED STATES PATENT AND TRADEMARK OFFICE
CERTIFICATE OF CORRECTION

PATENT NO. : 4,584,348
DATED : April 22, 1986
INVENTOR(S) : RIICHIRO NAGANO

It is certified that error appears in the above-identified patent and that said Letters Patent is hereby corrected as shown below:

ON THE TITLE PAGE

[73] Assignee:
delete "Inc.", insert --LTD--.

Signed and Sealed this

Fifteenth Day of July 1986

[SEAL]

Attest:

DONALD J. QUIGG

Attesting Officer          Commissioner of Patents and Trademarks